US011029907B2

(12) United States Patent
Myung et al.

(10) Patent No.: US 11,029,907 B2
(45) Date of Patent: Jun. 8, 2021

(54) ELECTRONIC DEVICE HAVING DOUBLE-SIDED DISPLAY AND METHOD FOR CONTROLLING APPLICATION

(71) Applicant: Samsung Electronics Co., Ltd., Gyeonggi-do (KR)

(72) Inventors: In Sik Myung, Incheon (KR); Hyun Soo Nah, Seoul (KR); Jung Won Lee, Seoul (KR); Jong Woo Jung, Gyeonggi-do (KR); In Young Choi, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/339,936

(22) PCT Filed: Sep. 29, 2017

(86) PCT No.: PCT/KR2017/011071
§ 371 (c)(1),
(2) Date: Apr. 5, 2019

(87) PCT Pub. No.: WO2018/066964
PCT Pub. Date: Apr. 12, 2018

(65) Prior Publication Data
US 2020/0050416 A1 Feb. 13, 2020

(30) Foreign Application Priority Data
Oct. 5, 2016 (KR) .................. 10-2016-0128390

(51) Int. Cl.
*G06F 3/041* (2006.01)
*G06F 3/045* (2006.01)
(Continued)

(52) U.S. Cl.
CPC .......... *G06F 3/1423* (2013.01); *G06F 1/1647* (2013.01); *G06F 1/1652* (2013.01);
(Continued)

(58) Field of Classification Search
CPC ... G06F 3/04883; G06F 3/04886; G06F 3/044
See application file for complete search history.

(56) References Cited

U.S. PATENT DOCUMENTS 7,471,890 B2   12/2008   Lee et al.
8,259,083 B2    9/2012   Kim
(Continued)

FOREIGN PATENT DOCUMENTS

KR    1020150069379    6/2015
KR      101574118     12/2015

OTHER PUBLICATIONS

European Search Report dated Jul. 25, 2019 issued in counterpart application No. 17858758.0-1216, 8 pages.
(Continued)

*Primary Examiner* — Nan-Ying Yang
(74) *Attorney, Agent, or Firm* — The Farrell Law Firm, P.C.

(57) ABSTRACT

An electronic device is disclosed. The electronic device may include a front display and a rear display, a touch panel to sense a user input, a camera disposed on a rear surface of the electronic device, and at least one processor. The at least one processor may output an image, which is obtained by the camera in a first shooting mode, to the rear display, output the image, which is obtained by the camera in a second shooting mode, to the front display, and control the camera in response to the user input sensed to the front display. Moreover, various embodiment found through the disclosure are possible.

13 Claims, 10 Drawing Sheets

(51) Int. Cl.
- *G06F 3/14* (2006.01)
- *H04N 5/232* (2006.01)
- *G06F 1/16* (2006.01)
- *G06F 3/0488* (2013.01)
- *G06F 3/147* (2006.01)
- *H04N 5/225* (2006.01)

(52) U.S. Cl.
CPC .......... *G06F 3/041* (2013.01); *G06F 3/04886* (2013.01); *G06F 3/147* (2013.01); *H04N 5/2257* (2013.01); *H04N 5/23219* (2013.01); *H04N 5/232935* (2018.08); *G06F 2203/04102* (2013.01)

(56) References Cited

U.S. PATENT DOCUMENTS

| | | |
|---|---|---|
| 8,446,377 B2 | 5/2013 | Estrada et al. |
| 8,605,005 B2 | 12/2013 | Lee et al. |
| 8,605,007 B2 | 12/2013 | Lee et al. |
| 9,830,121 B2 | 11/2017 | Sirpal et al. |
| 2007/0035616 A1 | 2/2007 | Lee et al. |
| 2009/0022428 A1 | 1/2009 | Lee et al. |
| 2009/0131117 A1* | 5/2009 | Choi .................... G06F 1/1616 455/566 |
| 2010/0020034 A1 | 1/2010 | Kim |
| 2010/0048194 A1* | 2/2010 | Park .................... G06F 1/1626 455/418 |
| 2010/0245256 A1 | 9/2010 | Estrada et al. |
| 2011/0304760 A1 | 12/2011 | Lee et al. |
| 2012/0218191 A1 | 8/2012 | Huang et al. |
| 2013/0244732 A1 | 9/2013 | Gorilovsky et al. |
| 2013/0335298 A1 | 12/2013 | Karmanenko et al. |
| 2013/0344705 A1 | 12/2013 | Mikhnenko |
| 2014/0080546 A1 | 3/2014 | Gorilovsky |
| 2014/0129681 A1 | 5/2014 | Gorilovsky et al. |
| 2014/0155120 A1 | 6/2014 | Karmanenko et al. |
| 2014/0310643 A1 | 10/2014 | Karmanenko et al. |
| 2014/0342782 A1 | 11/2014 | Karmanenko et al. |
| 2015/0035770 A1* | 2/2015 | Lee .................... G06F 3/041 345/173 |
| 2015/0169006 A1 | 6/2015 | Chong et al. |
| 2015/0324002 A1 | 11/2015 | Quiet et al. |
| 2015/0338988 A1* | 11/2015 | Lee .................... G06F 1/1613 345/173 |
| 2016/0048222 A1 | 2/2016 | Sirpal et al. |
| 2018/0039376 A1* | 2/2018 | Peterson ................ G06F 3/041 |

OTHER PUBLICATIONS

PCT/ISA/210 Search Report issued on PCT/KR2017/011071, pp. 13.

PCT/ISA/237 Written Opinion issued on PCT/KR2017/011071, pp. 8.

European Search Report dated Dec. 17, 2020 issued in counterpart application No. 17858758.0-1216, 5 pages.

* cited by examiner

ELECTRONIC DEVICE HAVING DOUBLE-SIDED DISPLAY AND METHOD FOR CONTROLLING APPLICATION

PRIORITY

This application is a National Phase Entry of PCT International Application No. PCT/KR2017/011071 which was filed on Sep. 29, 2017, and claims priority to Korean Patent Application No. 10-2016-0128390, which was filed on Oct. 5, 2016, the content of each of which is incorporated herein by reference.

TECHNICAL FIELD

Embodiments disclosed in the disclosure relate to techniques for controlling an application on an electronic device having a double-sided display.

BACKGROUND ART

In general, an electronic device, such as a smartphone, includes a display only on one surface thereof. Such an electronic device typically includes front and rear cameras, the front camera for Selfie-shooting has lower specifications, and the rear camera for target shooting has higher specifications.

In addition, an application installed in the electronic device is generally designed in consideration of single front display.

DISCLOSURE

Technical Problem

On the front surface of the electronic device, a bezel having a significantly large area is disposed at an upper area and a lower area due to a home button or a front camera. Accordingly, to provide a large screen without expanding the size of the electronic device to be larger, such a bezel area has to be reduced as much as possible. However, a camera function is very important in the electronic device. In particular, a selfie-taking function is an indispensable element in a user terminal to provide the camera function and a video conference function. Accordingly, it is not easy to remove the front camera from the front surface of the electronic device without suggesting the alternative on the selfie-taking function.

In addition, when it is assumed that the electronic device has a double-side display, a manner of executing the application, which is the same as the conventional manner, may increase the battery consumption of the electronic device or may increase the frequency of malfunction due to an unintended input. Accordingly, the execution form of the application suitable for the electronic device including the double-sided display has to be considered.

Various embodiments disclosed in the disclosure are to provide various devices and various methods to solve the above-described problems.

Technical Solution

According to an embodiment disclosed in the disclosure, an electronic device may include a front display and a rear display, a touch panel configured to sense a user input to the front display or the rear display, a camera disposed on a rear surface of the electronic device, and at least one processor electrically connected with the front display, the rear display, the touch panel, and the camera. The at least one processor may output an image, which is obtained by the camera in a first shooting mode, to the rear display, output the image, which is obtained by the camera in a second shooting mode, to the front display, and control the camera in response to the user input sensed to the front display.

According to another embodiment disclosed in the disclosure, an electronic device may include a front display and a rear display, a touch panel to sense a user input to the front display or the rear display, a memory in which an application is stored, and at least one processor The at least one processor may output the same execution screen on the front display and the rear display, when executing the application, the execution screen may include a first object to edit contents or control the application on the front display, and a second object to edit the contents or control the application on the rear display, and the at least one processor may visually differently display the first object and the second object.

According to still another embodiment disclosed in the disclosure, an electronic device may include a front display and a rear display, a touch panel to sense a user input to the front display or the rear display, a memory in which an application is stored, and at least one processor The at least one processor may output mutually different execution screens to the front display and the rear display, when the application supports a double-sided display, and may output an execution screen of the application to the front display when the application does not support the double-sided display.

Advantageous Effects

According to embodiments disclosed in the disclosure, the mobile device having the double-sided touch screen may effectively control the application by utilizing two touch screens.

In addition, the camera disposed on the rear surface of the electronic device may be utilized for various purposes and the area for the front display may be ensured to the maximum.

Besides, a variety of effects directly or indirectly understood through the disclosure may be provided.

MODE FOR INVENTION

Figure 1:
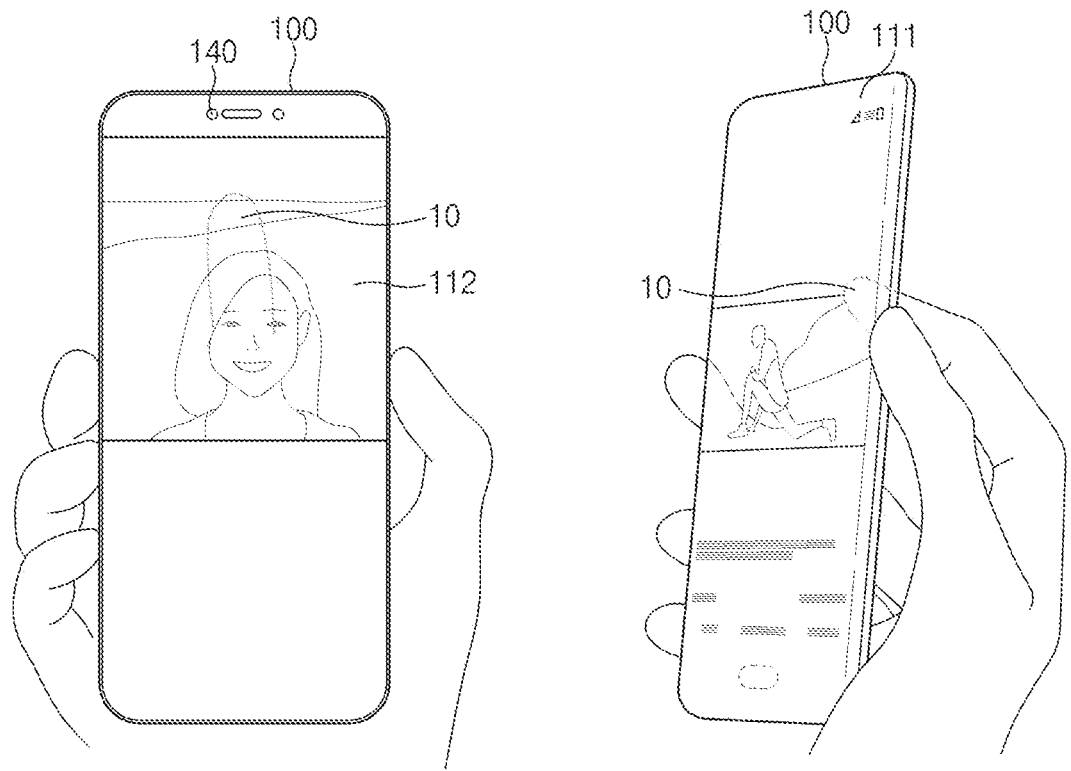
FIG. 1 illustrates a function performed by utilizing front and rear displays of an electronic device, according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

Hereinafter, electronic devices according to various embodiments will be described with reference to the accompanying drawings.

FIG. 1 illustrates a function performed by utilizing front and rear displays of an electronic device, according to an embodiment.

The left example of FIG. 1 illustrates that a selfie (self-portrait photograph) is taken by using a rear display 112 of an electronic device 100. For example, a user may take a photo of himself/herself using a camera 140 positioned on the rear surface of the electronic device 100 while holding the electronic device 100. The rear surface of the electronic device 100 may correspond to a surface on which a smaller display is disposed, a surface on which the camera is disposed, or a surface on which a camera having a higher specification is disposed. The front surface of the electronic device 100 may correspond to a surface on which a larger display is disposed, a surface on which the camera is absent, or a surface on which a camera having a lower specification is disposed.

In other words, it may be understood that the left drawing of FIG. 1 illustrates an example of taking a selfie by using a camera positioned on the same plane as that of a second display in an electronic device having a first display (e.g., a front display) and the second display (e.g., a rear display) facing in mutually different directions.

In the left example of FIG. 1, the user may identify an appearance of a target (e.g., a user's own appearance), which is to be photographed, through the rear display 112 of the electronic device 100. For example, the electronic device 100 may output an image, which is obtained through a lens of the camera 140, to the rear display 112 in a selfie shooting mode. The user may take a selfie by providing a touch input to the front display 111 using a finger (e.g., an index finger). The electronic device 100 may output, to the rear display 112, an area in which the user input is sensed, when the user input to a front display 111 is sensed.

In an embodiment, a selfie shooting function may be provided by using the camera disposed on the rear surface of the electronic device 100. In addition, a normal shooting function may be provided by using the camera 140 disposed on the rear surface of the electronic device 100. For example, when photographing a target by using the camera 140, an image obtained through a lens of the camera 140 may be output to the front display 111. In other words, according to an embodiment, as both the selfie shooting function and the normal shooting function are supported by the camera 140 disposed on the rear surface of the electronic device 100, a user may obtain a high-quality selfie, the internal space of the electronic device 100 occupied by the camera may be reduced, and a portion or an entire portion of a bezel area, which is occupied by the camera for taking a selfie, on the front surface of the electronic device 100 may be utilized as an area for the front display 111.

The right example in FIG. 1 illustrates that contents are consumed by using the front display 111 of the electronic device 100.

For example, a user may view contents such as Facebook, Twitter, a moving picture, an image, or a webpage by using the electronic device 100. In an embodiment, the user may input a control command for the contents through the rear display 112 of the electronic device 100 while viewing the contents displayed on the front display 111 of the electronic device 100. For example, the user may provide a touch input, such as "drag" or "swipe", to the rear display 112 and the electronic device 100 may control the contents based on the touch input. For example, when the user provides a user input of dragging down the upper portion of the rear display 112 of the electronic device 100 with the index finger, the touch panel corresponding to the rear display 112 senses the user input, and the electronic device 100 may scroll down the contents based on the sensed user input.

In an embodiment, the user may control the contents with one hand without blocking the contents from the view of the user, by controlling the contents, which is output to the front display 111, with the user input provided through the rear display 112 when consuming the contents by using the front display 111 of the electronic device 100.

Figure 2:
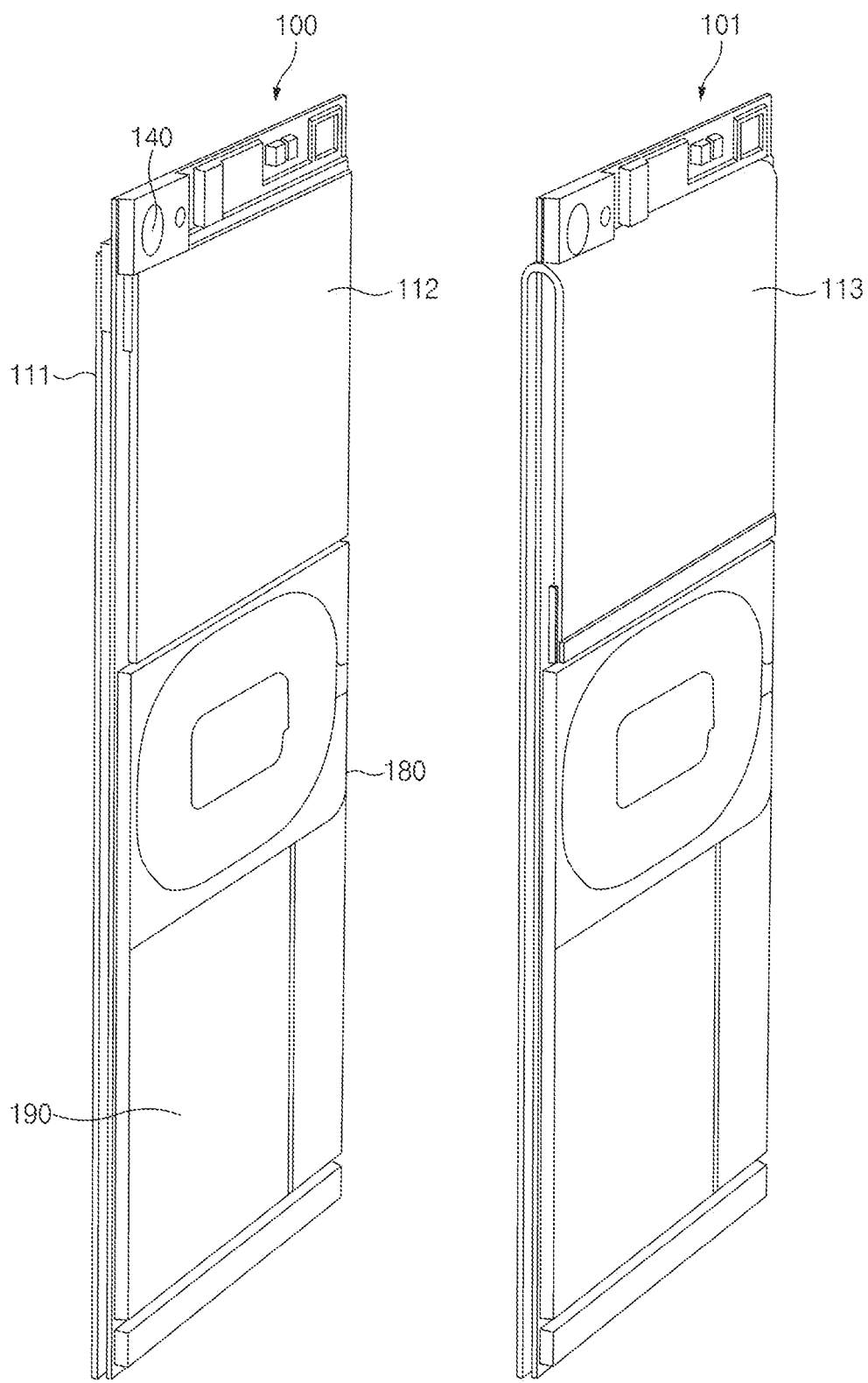
FIG. 2 illustrates configurations of front and rear displays of the electronic device, according to an embodiment.

FIG. 2 illustrates the configurations of the front display and the rear display of the electronic device, according to an embodiment.

In an embodiment, the electronic device 100 may implement the front display 111 and the rear display 112 by using a plurality of display panels. This embodiment is illustrated at the left side of the FIG. 2. In another embodiment, an electronic device 101 may implement the front display 111 and the rear display 112 by using one display panel. This embodiment is illustrated at the right side of the FIG. 2.

Referring to the drawing illustrated at the left side of FIG. 2, the electronic device 100 may include the front display 111 and the rear display 112 implemented with display panels separated from each other. The front display 111 and the rear display 112 may have mutually different sizes. For example, the front display 111 may have the size of substantially fully occupying the front surface of the electronic device 100. For example, a bezel area on the front surface may be replaced with a display area by removing a front camera for taking a selfie, by disposing a fingerprint sensor for user authentication at a lower layer of the front display 111, and by removing a physical home button or substituting the physical button with a touch pressure sensor or a soft home button.

The rear display 112 may have a size smaller than that of the front display 111, in consideration of a wireless charging coil 180 and/or a battery 190 provided in the electronic device 100. For example, when the front display 111 has the size of 5.5 inches, the rear display 112 may have the size of 4.2 inches with the aspect ratio of 3:4 or may have the size of 3.2 inches with the aspect ratio of 4:3.

Referring to the drawing illustrated at the right side of FIG. 2, the electronic device 101 may include a front-rear display 113 implemented with an integral-type flexible display. It may be understood that an area corresponding to a front surface of the display 113 corresponds to the front display 111, and an area corresponding to a rear surface of the display 113 corresponds to the rear display 112. It is assumed that the electronic device 101 and the electronic device 100 have the same components except for the display.

The electronic devices 100 and 101 may recognize a touch input of a user to the displays 111, 112, and 113. For example, each of the displays 111, 112, and 113 may include a touch panel, which is to recognize the touch input, inside a display panel. As another example, the touch panel to recognize the touch input may be disposed at an upper layer or a lower layer of each of the displays 111, 112, and 113.

The configuration and the operation of the electronic device 100 associated with the FIG. 2 will be described below with reference to FIG. 3. Although the following description made with reference to FIG. 3 focuses on the electronic device 100, the same description will be applied even to the electronic device 101 in which the front and rear displays are implemented with one flexible display panel.

Figure 3:
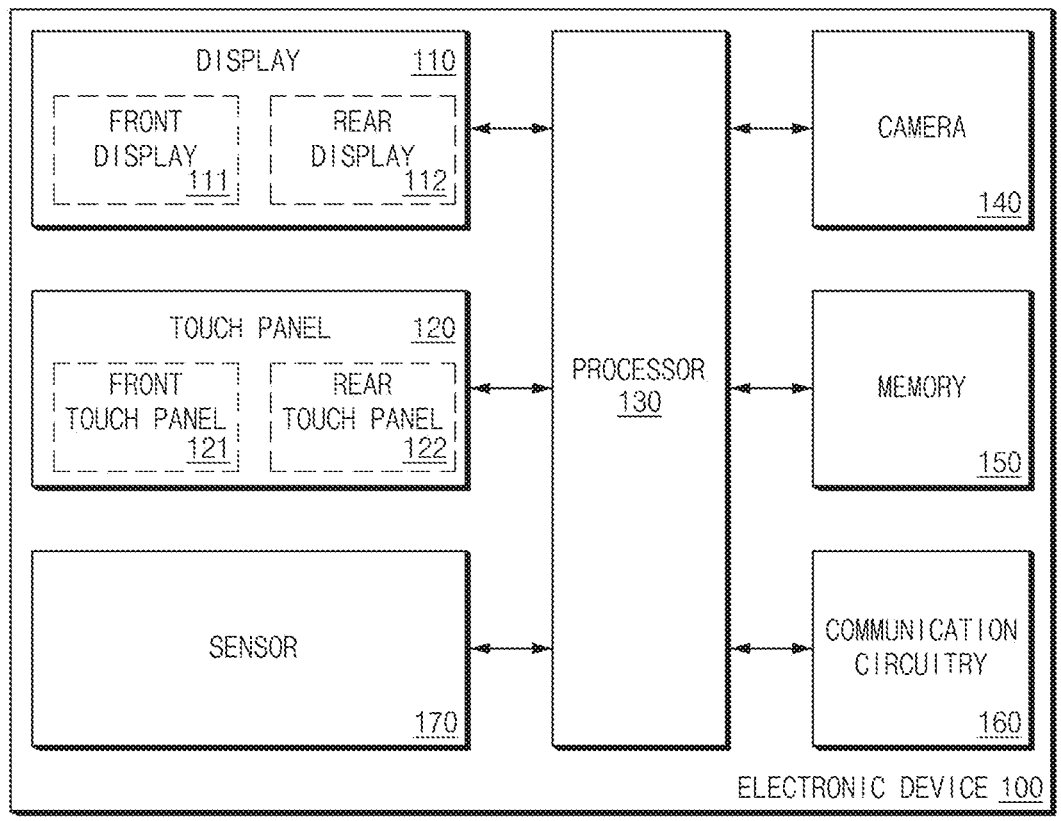
FIG. 3 illustrates the hardware configuration of the electronic device, according to an embodiment.

FIG. 3 illustrates the hardware configuration of the electronic device, according to an embodiment.

Referring to FIG. 3, the electronic device 100 may include a display 110, a touch panel 120, at least one processor 130, the camera 140, a memory 150, a communication circuitry 160, and at least one sensor 170.

The display 110 may include the front display 111 and the rear display 112. Similarly to the electronic device 100 of FIG. 2, when the front display 111 and the rear display 112 are implemented with different display panels, the front display 111 may be implemented with a first display panel, and the rear display 112 may implemented with a second display panel physically separated from the first display panel. Similarly to the electronic device 101 of FIG. 2, when the front display 111 and the rear display 112 are implemented with one display panel, the front display 111 and the rear display 112 may be implemented with one display panel curved inside the electronic device 100 (or the electronic device 101). In this case, the electronic device 100 may include the touch panel 120 to sense a user input to the front display 111 or the rear display 112. Even the touch panel 120 may be implemented with a plurality of touch panels or one touch panel, similarly to the display 110. For example, a touch panel corresponding to the front display 111 may correspond to a front touch panel 121, and a touch panel corresponding to the rear display 112 may correspond to a rear touch panel 122. In an embodiment, when the display 110 is implemented with one display panel, the touch panel 120 may be also implemented with one touch panel.

The at least one processor 130 may be understood as the concept including a control circuitry to control various sensors or hardware, as well as a processing device such as an application processor (AP), a CPU or a GPU. For example, the at least one processor 130 may include a touch IC, a power management IC (PMIC), an image signal processor (ISP) electrically connected with the camera 140, and the like. In the disclosure, although the at least one processor 130 is simply referred to as the processor 130, the processor 130 may means the at least one processor 130.

The camera 140 may be disposed on the rear surface of the electronic device 100, on which the rear display 112 is disposed. However, in another embodiment, the electronic device 100 may include a plurality of cameras on the front surface and the rear surface thereof. For example, the electronic device 100 may include a plurality of cameras (e.g., dual cameras) on the rear surface thereof, or may include at least one camera on each of the front surface and the rear surface thereof.

The memory 150 may store a plurality of applications and contents consumed in the applications. In an embodiment, when the application installed in the memory 150 is executed by the processor 130, the application and the contents may be properly disposed on the front display 111 and/or the rear display 112.

The communication circuitry 160 may form a communication channel between the electronic device 100 and a content provider server and may obtain contents, which are to be output to the display 110, from the content provider server.

The electronic device 100 may include the at least one sensor 170. For example, the electronic device 100 may include an acceleration sensor, a gyro sensor, an illuminance sensor, or a pressure sensor to sense the pressure of the touch input to the display 110.

The configuration of the electronic device 100 described with reference to FIG. 3 is provided for the illustrative purpose, and a person skilled in the art may exclude some of the components in FIG. 3 or add another component, while maintaining the feature of the invention disclosed in the disclosure. Hereinafter, expanded examples of the electronic device 100 will be described.

The electronic device 100, which includes the front display 111 and the rear display 112, may recognize a user input to the front display 111 and the rear display 112. Accordingly, various embodiments based on this may be implemented. For example, in an embodiment, the electronic device 100 may output contents to the front display 111 and control the contents output to the front display 111 through a touch input to the rear display 112. In another embodiment, the electronic device 100 may output the same contents to the front display 111 and the rear display 112 and individually control the contents through touch inputs to the front display 111 and the rear display 112. In still another embodiment, the electronic device 100 may output contents, which are partially different from contents output to the front display 111, to the rear display 112 and individually control contents through respective touch inputs to the front display 111 and the rear display 112.

Hereinafter, various embodiments will be described with reference to FIG. 4.

Figure 4:
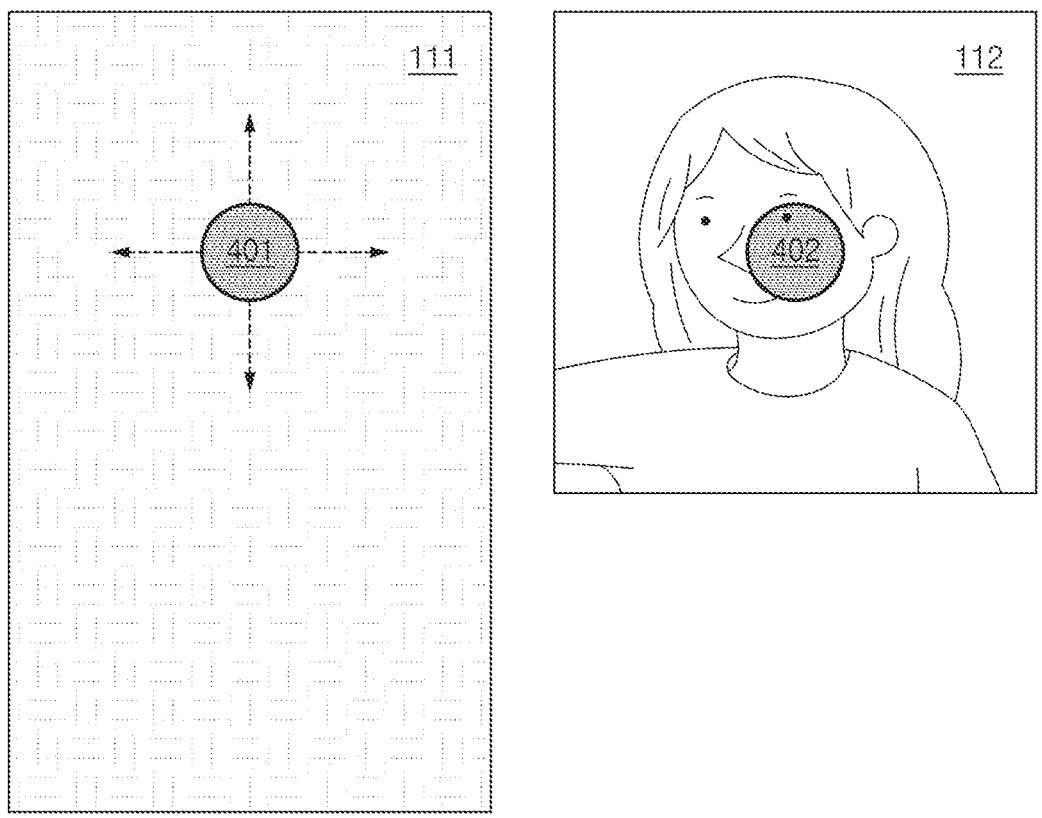
FIG. 4 illustrates an example of obtaining a selfie image using a rear camera, according to an embodiment.

FIG. 4 illustrates an example of obtaining a selfie image using the rear camera, according to an embodiment.

Referring to FIG. 4, in the selfie shooting mode, the electronic device 100 activates a camera 400 disposed on the rear surface of the electronic device 100 and may photograph a target (e.g., a user). In this case, a preview image may be output to the rear display 112. In an embodiment, in the selfie shooting mode, the front display 111 may be turned off to save battery. Even if the front display 111 is turned off, the touch panel (e.g., the front touch panel 121) positioned in an area corresponding to the front display 111 may be maintained in an activation state to recognize a user input to the front display 111.

In an embodiment, the electronic device 100 may enter into the selfie shooting mode based on various conditions. For example, the electronic device 100 may enter into the selfie shooting mode based on a user input for a specified menu or a specific control item. As another example, the electronic device 100 may automatically enter into the selfie shooting mode when the condition for selfie shooting is satisfied. For example, when the electronic device 100 senses, through the sensor 170 (e.g., the acceleration sensor and/or gyro sensor), that the electronic device 100 is oriented in a direction perpendicular to the ground surface (portrait mode) and when the face of the user is recognized by the camera 140, the electronic device 100 may determine that a user intends to take a selfie, and may start the selfie shooting mode. In this case, the camera 140 is always activated (always-on) and the face of the user may be recognized in advance through a process such as the registration procedure the user.

If another image is recognized by the camera 140 instead of the face of the user, the electronic device 100 may recognize that the user photographs another target, and may enter into a normal shooting mode. In addition, when it is sensed by the sensor 170 that the electronic device 100 is oriented in a direction horizontal to the ground surface (landscape mode) even if the face of the user is recognized, the electronic device 100 may recognize that another person may photograph the face of the user and may enter the normal shooting mode. In various embodiments, a shooting mode may be changed by device setting or user setting. For example, when entrance to the selfie shooting mode is set if the face of the user is recognized, the electronic device 100 may enter in the selfie shooting mode even if the electronic device 100 is oriented in the landscape mode.

In an embodiment, when the selfie shooting mode is started, the processor 130 may output an image obtained by the camera 140 to the rear display 112, may set the front display 111 to be turned off, and may activate the touch panel corresponding to the front display 111. The processor 130 may control the operation of the camera 140 in response to the user input sensed to the front display 111.

In an embodiment, when the normal shooting mode is started, the processor 130 may output an image, which is obtained by the camera 140, to the front display 111. In the normal shooting mode, the processor 130 may control the operation of the camera 140 in response to the user input sensed to the front display 111. In the normal shooting mode, the rear display 112 may be turned off because the user is expected to look at the front display 111.

Referring back to FIG. 4, the processor 130 may display a user input 401, which is sensed to the front display 111 in the selfie-shooting mode, on a corresponding area 402 of the rear display 112. The user may appropriately provide the user input, or may remove an unintended user input, depending on the user input displayed on the rear display 112. For example, when a user input generated to the front display 111 by the grip of the electronic device 100 is displayed on the rear display 112, the user may remove an unintended user input by differently gripping the electronic device 100.

According to an embodiment, in the selfie shooting mode, the processor 130 may control shooting or shooting settings, based on the user input to the front display 111. A user input valid in the selfie shooting mode may be predefined. For example, in an embodiment, one-point touch may be more useful than a multi-touch (e.g., two or three-point touch) because a user, who is taking the selfie, controls the electronic device 100 with one hand. Accordingly, in the selfie shooting mode, the processor 130 may process only one-point touch of touch inputs to the front display 111 as a valid input. For example, an input, such as a single tap, a double tap, a drag, and a swipe, may be processed as a valid input. For example, the single tap may be mapped to a control command for taking an image, the double tap may be mapped to a control command for taking a video, the drag may be mapped to a control command for a zoom function (e.g., "drag down" corresponds to "zoom in", and "drag up" corresponds to "zoom out"), and the swipe may be mapped to a control command for applying a next/previous filter or for "Flash ON/OFF".

In an embodiment, in the selfie shooting mode, the processor 130 may activate only a portion of the front touch panel 121. For example, the processor 130 may activate only an area, which corresponds to the rear display 112, of the front touch panel 121. Accordingly, the unnecessary touch generated by the grip of the electronic device 100 may be prevented, and power consumption may be reduced.

Figure 5:
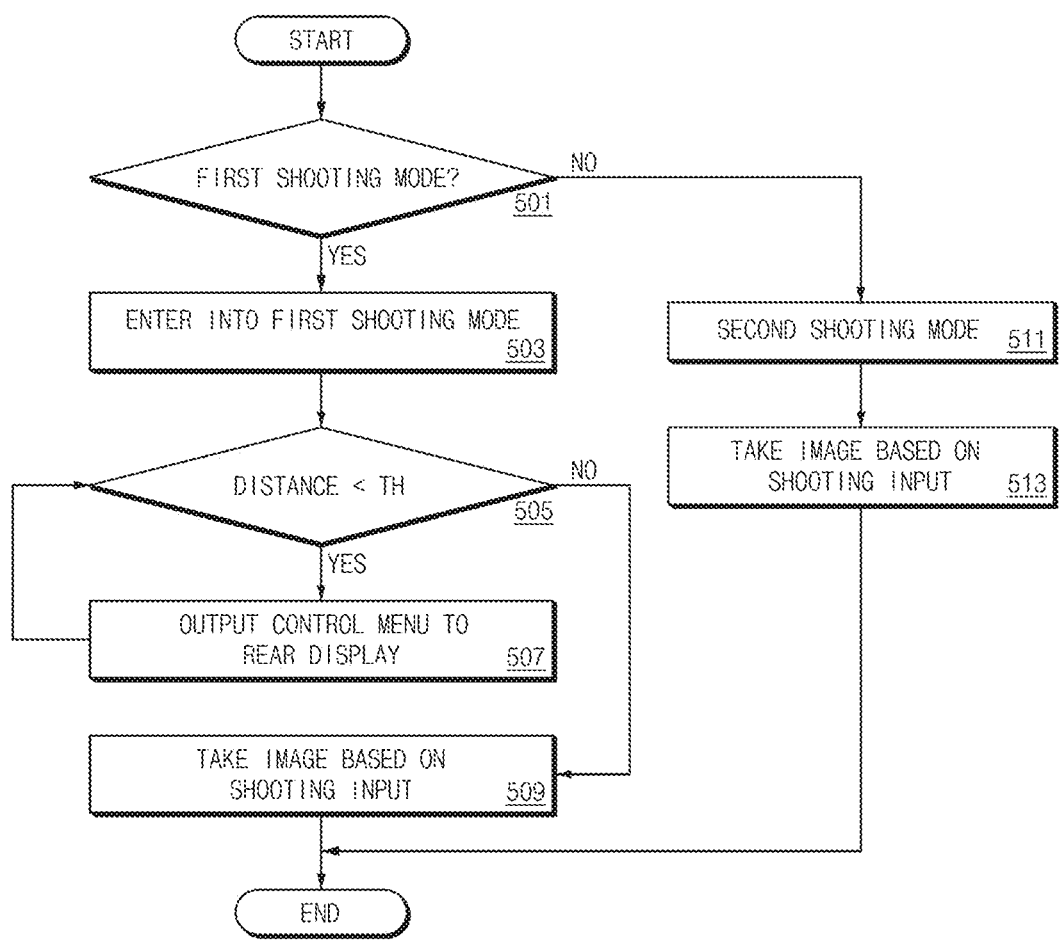
FIG. 5 illustrates a shooting operation based on a shooting mode of the electronic device, according to an embodiment.

FIG. 5 illustrates a shooting operation based on the shooting mode of the electronic device 100, according to an embodiment. Regarding FIG. 5, description similar to, the same as, or corresponding to the description made with reference to FIG. 4 will be omitted.

Referring to FIG. 5, in operation 501, the electronic device 100 may determine whether a condition for the entrance into a first shooting mode is satisfied. For example, the electronic device 100 may determine whether a specific event (e.g., user input) occurs, or whether the information obtained by the sensor 170 or the camera 140 satisfies a condition for starting the first shooting mode. The first shooting mode is a mode to output an image, which is obtained by the rear camera, to the rear display 112 and to control the image through the front display 111. For example, the first shooting mode may correspond to the above-described selfie shooting mode.

When the condition is satisfied, the electronic device 100 may enter into the first shooting mode in operation 503. In this case, the electronic device 100 may output the image, which is obtained through the rear camera, to the rear display 112, and may turn off the front display 111. However, the electronic device 100 may activate the front touch panel 121.

In operation 505, the electronic device 100 may determine whether the distance between a subject (e.g., the face of the user) recognized by the camera 140 and the electronic device 100 is less than a specific threshold value. For example, the camera 140 may determine the distance between the subject and the lens (i.e., the electronic device 100) while adjusting the focus on the subject.

When the distance between the subject and the electronic device 100 is less than the threshold value, the electronic device 100 may determine that the user makes the electronic device 100 closer to the subject to control the shooting setting and may output a control menu, such as filter setting, flash setting, aspect ratio setting, or shooting mode setting, to the rear display 112 in operation 507. In this case, even if the face of the user is not recognized by the camera 140, the electronic device 100 may maintain the first shooting mode. When a user input for changing the shooting mode occurs or a specific time elapses in this state, the electronic device 100 may switch from the first shooting mode to a second shooting mode.

If the distance between the subject and the electronic device 100 is greater than the threshold value, the processor 130 may control the camera 140 to take an image based on a shooting input of a user to the front display 111 in operation 509.

When the condition for the entrance into the first shooting mode in operation 501 is not satisfied, the electronic device 100 may enter into the second shooting mode in operation 511. The second shooting mode is a mode to output an image, which is obtained by the rear camera, to the front display 111 and to control the image through the front display 111. For example, the second shooting mode may correspond to the above-described normal shooting mode. The electronic device 100 may control the camera 140 to take an image based on the shooting input of the user to the front display 111 in operation 513.

Hereinafter, description will be made with reference to FIGS. 4 and 5 regarding embodiments of providing an input on the front display 111 to control contents displayed on the rear surface, and regarding embodiments (e.g., a normal shooting mode) of providing an input on the front display 111 to control contents displayed on the front surface. In addition, an input may be provided on the rear display 112 to control contents displayed on the front display 111 as in an embodiment illustrated at the right side of FIG. 1.

Therefore, according to an embodiment, the electronic device 100 may control contents displayed on the first display, based on a user input provided to the second display facing a side different from that of the first display. In this case, the user input provided on the second display may be displayed on the first display. In addition, the second display may be turned off and the touch panel corresponding to the second display may be activated. In addition, an area, which may be controlled by the user input through the second display, among the contents, an application control item, and menus displayed on the first display may be output while being distinguished from other areas (e.g., in color or through highlight).

Hereinafter, an embodiment of controlling contents using both the first display and the second display will be described with reference to FIGS. 6 and 7. In the following description, description overlapped with above description will be omitted. The description of hardware associated with FIGS. 1 to 3 may still be applied to the following description.

Figure 6:
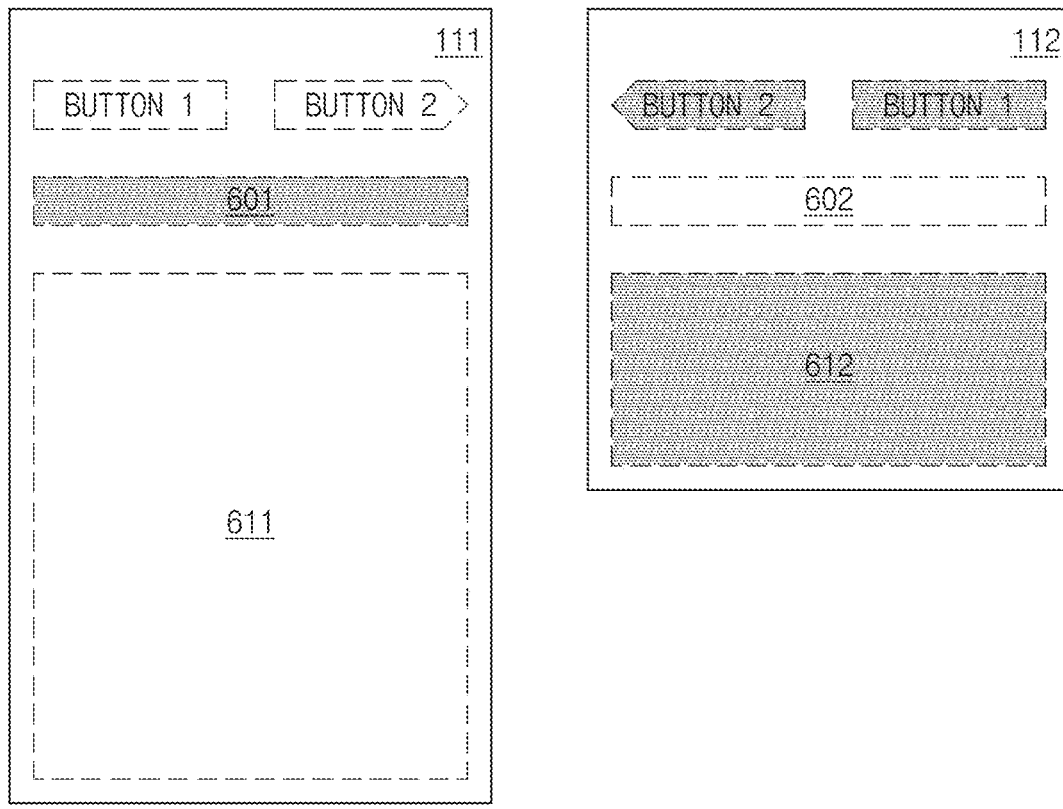
FIG. 6 illustrates a screen for controlling an application on front and rear surfaces of the electronic device, according to an embodiment.

FIG. 6 illustrates a screen for controlling an application on front and rear surfaces of the electronic device, according to an embodiment.

Referring to FIG. 6, an execution screen of the same application may be output to the front display 111 and the rear display 112. For example, in an embodiment, when an application is executed, an execution screen of the application, which includes an application UI and contents (e.g., a photograph, a video, a webpage, or the like), is output to the front display 111, and the execution screen of the application the same as that of the front display 111 may be output to the rear display 112. In this case, one execution screen may be resized based on the difference in resolution between the front display 111 and the rear display 112. In another embodiment, when the application is executed, the execution screen of the application may be output to the front display 111, and the execution screen of the application, which is the same as that of the front display 111 and is within an allowed resolution range, to the rear display 112. In other words, a partial area of the execution screen output to the front display 111 may not be viewed on the rear display 112.

In an embodiment, the front display 111 and the rear display 112 may display an execution screen of an application, which includes a plurality of objects to control the application or to edit contents. For example, when a specified image is output with respect to a photo application, an execution screen of the photo application, which includes the specific image, an editing menu (e.g., cropping, image name changing, filter applying, or the like) to edit the specific image, and a control item (e.g., image sharing, folder generating, image deleting, font size setting or the like) of the application), may be output to the front display 111 and the rear display 112.

Referring to FIG. 6, a first button (BUTTON 1), a second button (BUTTON 2), a control item 601, and an editing menu 611 may be displayed on the front display 111. The first button (BUTTON 1) and the second button (BUTTON 2), a control item 602, and an editing menu 612 may also be displayed on the rear display 112. On the front display 111 and the rear display 112, the functions of objects at corresponding positions correspond to each other.

In the embodiment illustrated in FIG. 6, a user may control the first button, the second button, and the editing menu 611 through the front display 111. In other words, although a user input provided to the front display 111 is sensed by the front touch panel 121 corresponding to the front display 111, the user input is not processed as a valid user input in relation to the control item 601. To the contrary, although the user may control the control item 602 through the rear display 112, the user may not control other objects. The processor 130 may normally display an object, which is controllable on the front display 111, and may display an object, which is non-controllable, in such a manner that the object is dimmed. Similarly, the processor 130 may normally display an object, which is controllable on the rear display 112, and display an object, which is non-controllable, in such a manner that the object is dimmed. The dimming is provided for the illustrative purpose, and the processor 130 may display a specific menu in an appropriate manner, for example, may highlight the specific menu such that the user viewing each display recognizes the specific menu non-controllable on a relevant display. For example, when a first object, which is controllable on the front display 111, is output in a first type to the front display 111, and a second object, which is non-controllable on the front display 111, is output in the second type to the front display 111, the first object may be output in the second type and the second object may be output in the first type, to the rear display 112.

In an embodiment, an object controllable on both the front display 111 and the rear display 112 may be included in the execution screen. For example, an important button, such as a button of "store", may be output to both the front display 111 and the rear display 112. In this case, the object, which is controllable on both surfaces, may be output in the same type as that of the first object (e.g., the first type) which is controllable only on the relevant display. However, in another example, an object, which is controllable on both surfaces, may be output in separate types (e.g., fluorescent highlighting, or the like).

In an embodiment, objects of the front display 111 and the rear display 112 may correspond to mirror images which are left-and-right reversed. For example, the first button and the second button displayed on the front display 111 may be in a mirror image relationship with the first button and the second button displayed on the rear display 112. In other words, the execution screen of the application output to the front display 111 and the execution screen of the application output to the rear display 112 may have images left-to-right reversed. However, the text included in the object may not be reversed such that the user reads the text normally.

Figure 7:
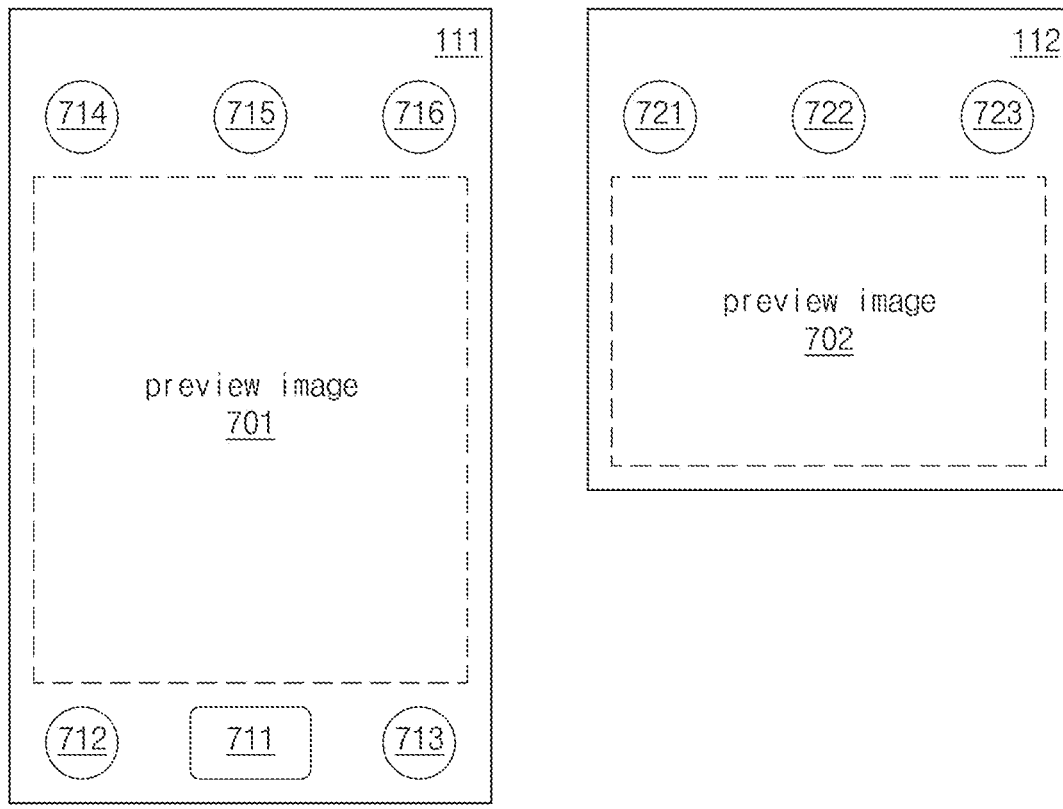
FIG. 7 illustrates a screen for controlling an application on the front and rear surfaces of the electronic device, according to another embodiment.

FIG. 7 illustrates a screen for controlling an application on the front and rear surfaces of the electronic device, according to another embodiment.

Referring to FIG. 7, an execution screen of the application may be output to the front display 111 and the rear display 112 of the electronic device 100, respectively. The processor 130 outputs the execution screen by utilizing both the front display 111 and the rear display 112 when the executed application supports a double-sided display. In addition, when the application does not support the double-sided display, the processor 130 may output the execution screen to any one of the front display 111 and the rear display 112. The embodiment of FIG. 6 may be applied, when the application supports the double-sided display and is set to output the same execution screen to the front display 111 and the rear display 112.

In an embodiment, the processor 130 may output an appropriate error message to an unsupported display, or may turn off the unsupported display, when the application does not support the double-sided display. For example, when the application supports the front display 111, the processor 130 may output the execution screen of the application to the front display 111, and may output, to the rear display 112, a message indicating that the application does not support the double-sided display or the rear display 112.

When an application supports the double-sided display, the processor 130 may output different execution screens of the application to the front display 111 and the rear display 112. Accordingly, different information is displayed on the front display 111 and the rear display 112, and the contents may be controlled (by different users) on the each surface.

In an embodiment, at least one common content may be output to the front display 111 and the rear display 112. For example, when a camera application is executed, a preview image may be commonly output to the front display 111 and the rear display 112. For example, a preview image 701 may be output to the front display 111, and a preview image 702 may be output to the rear display 112. The preview image 702 may be the same as a partial area of the preview image 701.

In an embodiment, objects, such as mutually different menu buttons or control items, may be output to the front display 111 and the rear display 112. For example, in the case of a camera application, a shutter menu 711, a shooting mode change menu 712, a gallery entering menu 713, a flash setting menu 714, a timer menu 715, and a HDR ON/OFF menu 716, and the like may be disposed on the front display 111. In addition, a filter menu 721, a camera changing menu 722, a setting menu 723, and the like may be disposed on the rear display 112. This menu configuration is provided only for the illustrative purpose. In another embodiment, a main control menu may be output to the front display 111, and an auxiliary control menu may be output to the rear display 112. The user(s) may simultaneously control menus on the front and rear surface of the electronic device 100.

In an embodiment, the processor 130 may provide information on a user input, which occurs through the front display 111, or feedback of the information to the rear display 112. For example, in the case of a camera application, when a timer is set to 10 seconds and the shutter button 711 is selected on the front display 111, a message indicating that shooting will start in 10 seconds may be output to the rear display 112. The user who has controlled the application on the rear display 112 may recognize the user input occurring on the front display 111 through this feedback and may take appropriate action (e.g., the user moves to a distance suitable for shooting and posing).

Figure 8:
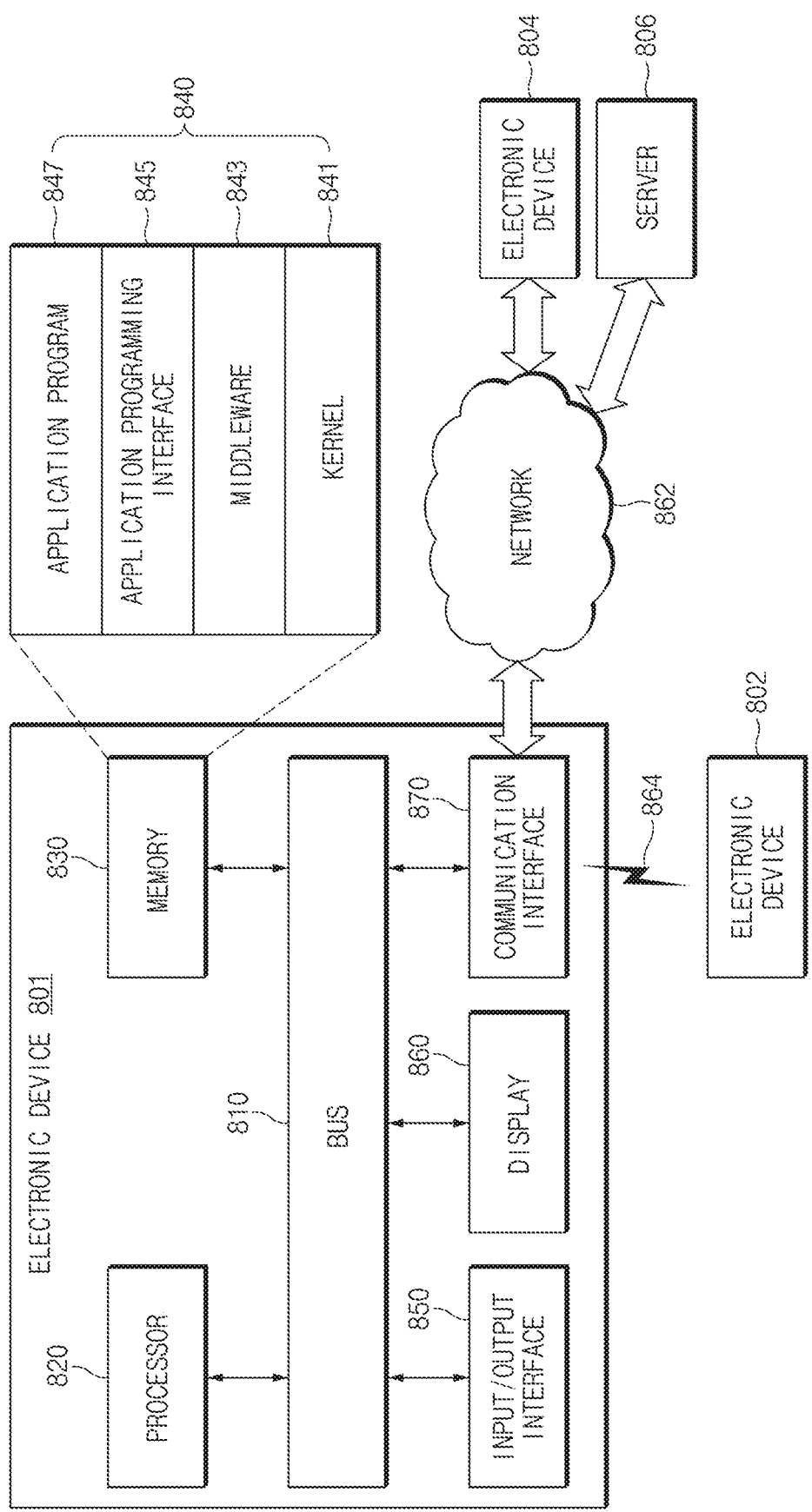
FIG. 8 illustrates an electronic device in a network environment according to various embodiments of the present disclosure.
Figure 9:
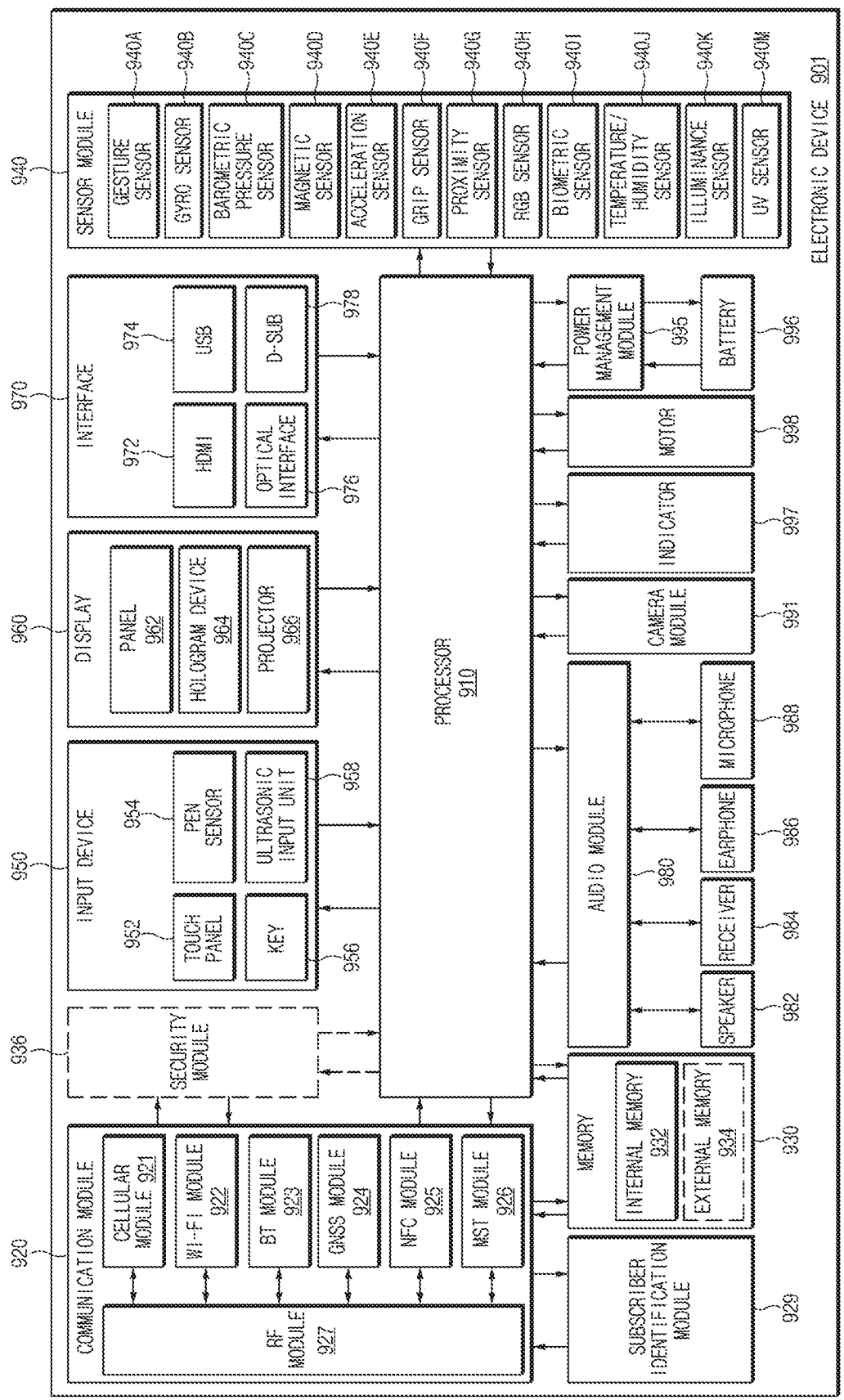
FIG. 9 is a block diagram of an electronic device according to various embodiments of the present disclosure.
Figure 10:
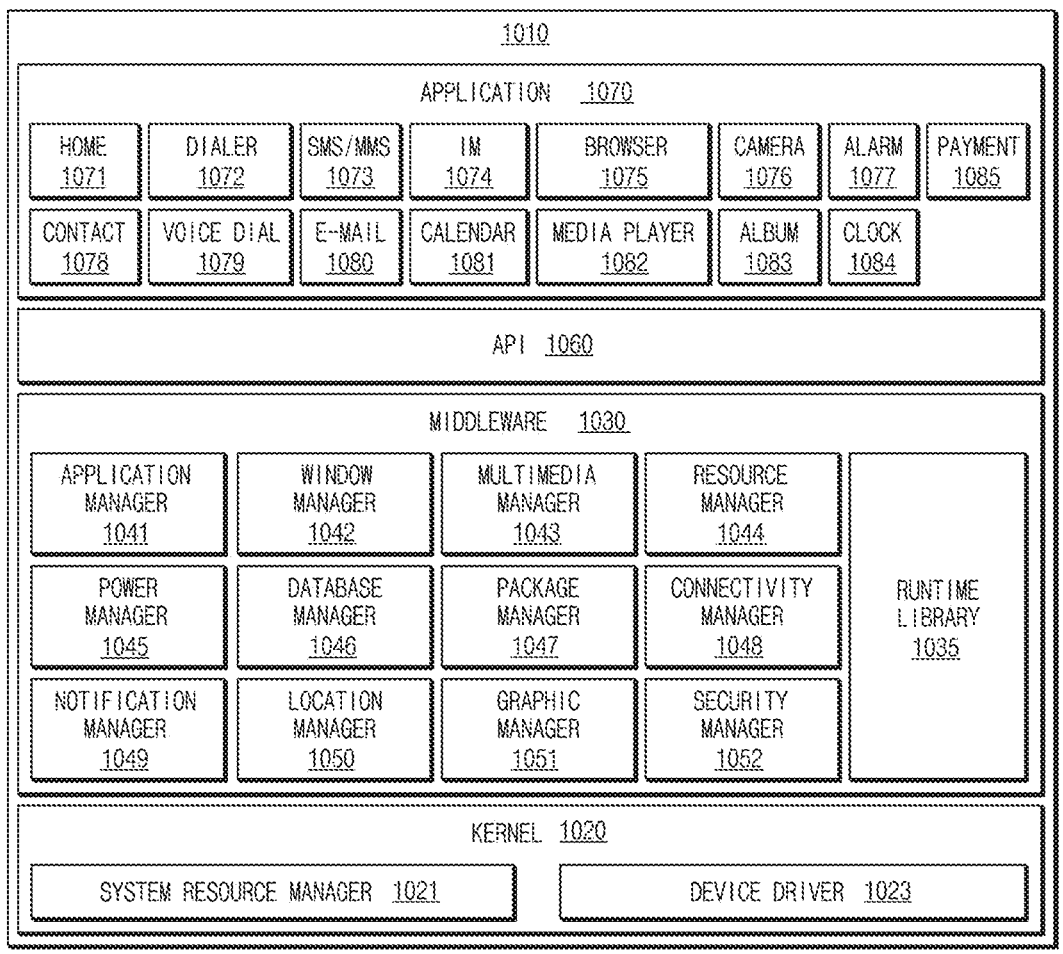
FIG. 10 is a block diagram of a program module according to various embodiments of the present disclosure.

FIGS. 8 to 10 illustrate an expanded example to various hardware and software of the electronic device 100. The description associated with the electronic device 100 may be expanded based on the description of the electronic device of FIGS. 8 to 10. For example, the processor 130 may correspond to a processor 820 of FIG. 8, the memory 150 may correspond to a memory 830 of FIG. 8, and the communication circuitry 160 may correspond to a communication module 920 of FIG. 9.

FIG. 8 illustrates an electronic device in a network environment, according to various embodiments.

Referring to FIG. 8, according to various embodiments, an electronic device 801, a first electronic device 802, a second electronic device 804, or a server 806 may be connected with each other over a network 1162 or local wireless communication 864. The electronic device 801 may include a bus 1110, a processor 820, a memory 830, an input/output interface 850, a display 860, and a communication interface 870. According to an embodiment, the electronic device 801 may not include at least one of the above-described elements or may further include other element(s).

For example, the bus 1110 may interconnect the above-described elements 810 to 870 and may include a circuit for conveying communications (e.g., a control message and/or data) among the above-described elements.

The processor 820 may include one or more of a central processing unit (CPU), an application processor (AP), or a communication processor (CP). For example, the processor 820 may perform an arithmetic operation or data processing associated with control and/or communication of at least other elements of the electronic device 801.

The memory 830 may include a volatile and/or nonvolatile memory. For example, the memory 830 may store instructions or data associated with at least one other element(s) of the electronic device 801. According to an embodiment, the memory 830 may store software and/or a program 840. The program 840 may include, for example, a kernel 841, a middleware 843, an application programming interface (API) 845, and/or an application program (or "an application") 847. At least a part of the kernel 841, the middleware 843, or the API 845 may be referred to as an "operating system (OS)".

For example, the kernel 841 may control or manage system resources (e.g., the bus 1110, the processor 820, the memory 830, and the like) that are used to execute operations or functions of other programs (e.g., the middleware 843, the API 845, and the application program 847). Furthermore, the kernel 841 may provide an interface that allows the middleware 843, the API 845, or the application program 847 to access discrete elements of the electronic device 801 so as to control or manage system resources.

The middleware 843 may perform, for example, a mediation role such that the API 845 or the application program 847 communicates with the kernel 841 to exchange data.

Furthermore, the middleware 843 may process one or more task requests received from the application program 847 according to a priority. For example, the middleware 843 may assign the priority, which makes it possible to use a system resource (e.g., the bus 1110, the processor 820, the memory 830, or the like) of the electronic device 801, to at least one of the application program 847. For example, the middleware 843 may process the one or more task requests according to the priority assigned to the at least one, which makes it possible to perform scheduling or load balancing on the one or more task requests.

The API 845 may be, for example, an interface through which the application program 847 controls a function provided by the kernel 841 or the middleware 843, and may include, for example, at least one interface or function (e.g., an instruction) for a file control, a window control, image processing, a character control, or the like.

The input/output interface 850 may play a role, for example, an interface which transmits an instruction or data input from a user or another external device, to other element(s) of the electronic device 801. Furthermore, the input/output interface 850 may output an instruction or data, received from other element(s) of the electronic device 801, to a user or another external device.

The display 860 may include, for example, a liquid crystal display (LCD), a light-emitting diode (LED) display, an organic LED (OLED) display, a microelectromechanical systems (MEMS) display, or an electronic paper display. The display 860 may display, for example, various contents (e.g., a text, an image, a video, an icon, a symbol, and the like) to a user. The display 860 may include a touch screen and may receive, for example, a touch, gesture, proximity, or hovering input using an electronic pen or a part of a user's body.

For example, the communication interface 870 may establish communication between the electronic device 801 and an external device (e.g., the first electronic device 802, the second electronic device 804, or the server 806). For example, the communication interface 870 may be connected to the network 862 over wireless communication or wired communication to communicate with the external device (e.g., the second electronic device 804 or the server 806).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the local wireless communication 864. The local wireless communication 864 may include at least one of wireless fidelity (Wi-Fi), light fidelity (Li-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 801 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 862 may include at least one of telecommunications networks, for example, a computer network (e.g., LAN or WAN), an Internet, or a telephone network.

Each of the first and second electronic devices 802 and 804 may be a device of which the type is different from or the same as that of the electronic device 801. According to an embodiment, the server 806 may include a group of one or more servers. According to various embodiments, all or a portion of operations that the electronic device 801 will perform may be executed by another or plural electronic devices (e.g., the first electronic device 802, the second electronic device 804 or the server 806). According to an embodiment, in the case where the electronic device 801 executes any function or service automatically or in response to a request, the electronic device 801 may not perform the function or the service internally, but, alternatively additionally, it may request at least a portion of a function associated with the electronic device 801 at other electronic device (e.g., the electronic device 802 or 804 or the server 806). The other electronic device may execute the requested function or additional function and may transmit the execution result to the electronic device 801. The electronic device 801 may provide the requested function or service using the received result or may additionally process the received result to provide the requested function or service. To this end, for example, cloud computing, distributed computing, or client-server computing may be used.

FIG. 9 illustrates a block diagram of an electronic device, according to various embodiments.

Referring to FIG. 9, an electronic device 901 may include, for example, all or a part of the electronic device 801 illustrated in FIG. 8. The electronic device 901 may include one or more processors (e.g., an application processor (AP)) 910, a communication module 920, a subscriber identification module 929, a memory 930, a sensor module 940, an input device 950, a display 960, an interface 970, an audio module 980, a camera module 991, a power management module 995, a battery 996, an indicator 997, and a motor 998.

The processor 910 may drive, for example, an operating system (OS) or an application to control a plurality of hardware or software elements connected to the processor 910 and may process and compute a variety of data. For example, the processor 910 may be implemented with a System on Chip (SoC). According to an embodiment, the processor 910 may further include a graphic processing unit (GPU) and/or an image signal processor. The processor 910 may include at least a part (e.g., a cellular module 921) of elements illustrated in FIG. 9. The processor 910 may load an instruction or data, which is received from at least one of other elements (e.g., a nonvolatile memory), into a volatile memory and process the loaded instruction or data. The processor 910 may store a variety of data in the nonvolatile memory.

The communication module 920 may be configured the same as or similar to the communication interface 870 of FIG. 8. The communication module 920 may include the cellular module 921, a Wi-Fi module 922, a Bluetooth (BT) module 923, a GNSS module 924 (e.g., a GPS module, a Glonass module, a Beidou module, or a Galileo module), a near field communication (NFC) module 925, a MST module 926 and a radio frequency (RF) module 927.

The cellular module 921 may provide, for example, voice communication, video communication, a character service, an Internet service, or the like over a communication network. According to an embodiment, the cellular module 921 may perform discrimination and authentication of the electronic device 901 within a communication network by using the subscriber identification module (e.g., a SIM card) 929. According to an embodiment, the cellular module 921 may perform at least a portion of functions that the processor 910 provides. According to an embodiment, the cellular module 921 may include a communication processor (CP).

Each of the Wi-Fi module 922, the BT module 923, the GNSS module 924, the NFC module 925, or the MST module 926 may include a processor for processing data exchanged through a corresponding module, for example. According to an embodiment, at least a part (e.g., two or more) of the cellular module 921, the Wi-Fi module 922, the BT module 923, the GNSS module 924, the NFC module 925, or the MST module 926 may be included within one Integrated Circuit (IC) or an IC package.

For example, the RF module 927 may transmit and receive a communication signal (e.g., an RF signal). For example, the RF module 927 may include a transceiver, a power amplifier module (PAM), a frequency filter, a low noise amplifier (LNA), an antenna, or the like. According to another embodiment, at least one of the cellular module 921, the Wi-Fi module 922, the BT module 923, the GNSS module 924, the NFC module 925, or the MST module 926 may transmit and receive an RF signal through a separate RF module.

The subscriber identification module 929 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 930 (e.g., the memory 830) may include an internal memory 932 or an external memory 934. For example, the internal memory 932 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 934 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 934 may be operatively and/or physically connected to the electronic device 901 through various interfaces.

A security module 936 may be a module that includes a storage space of which a security level is higher than that of the memory 930 and may be a circuit that guarantees safe data storage and a protected execution environment. The security module 936 may be implemented with a separate circuit and may include a separate processor. For example, the security module 936 may be in a smart chip or a secure digital (SD) card, which is removable, or may include an embedded secure element (eSE) embedded in a fixed chip of the electronic device 901. Furthermore, the security module 936 may operate based on an operating system (OS) that is different from the OS of the electronic device 901. For example, the security module 936 may operate based on java card open platform (JCOP) OS.

The sensor module 940 may measure, for example, a physical quantity or may detect an operation state of the electronic device 901. The sensor module 940 may convert the measured or detected information to an electric signal. For example, the sensor module 940 may include at least one of a gesture sensor 940A, a gyro sensor 940B, a barometric pressure sensor 940C, a magnetic sensor 940D, an acceleration sensor 940E, a grip sensor 940F, the proximity sensor 940G, a color sensor 940H (e.g., red, green, blue (RGB) sensor), a biometric sensor 940I, a temperature/humidity sensor 940J, an illuminance sensor 940K, or an UV sensor 940M. Although not illustrated, additionally or generally, the sensor module 940 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 940 may further include a control circuit for controlling at least one or more sensors included therein. According to an embodiment, the electronic device 901 may further include a processor that is a part of the processor 910 or independent of the processor 910 and is configured to control the sensor module 940. The processor may control the sensor module 940 while the processor 910 remains at a sleep state.

The input device 950 may include, for example, a touch panel 952, a (digital) pen sensor 954, a key 956, or an ultrasonic input unit 958. For example, the touch panel 952 may use at least one of capacitive, resistive, infrared and ultrasonic detecting methods. Also, the touch panel 952 may further include a control circuit. The touch panel 952 may further include a tactile layer to provide a tactile reaction to a user.

The (digital) pen sensor 954 may be, for example, a part of a touch panel or may include an additional sheet for recognition. The key 956 may include, for example, a physical button, an optical key, or a keypad. The ultrasonic input device 958 may detect (or sense) an ultrasonic signal, which is generated from an input device, through a microphone (e.g., a microphone 988) and may check data corresponding to the detected ultrasonic signal.

The display 960 (e.g., the display 860) may include a panel 962, a hologram device 964, or a projector 966. The panel 962 may be the same as or similar to the display 860 illustrated in FIG. 8. The panel 962 may be implemented, for example, to be flexible, transparent or wearable. The panel 962 and the touch panel 952 may be integrated into a single module. The hologram device 964 may display a stereoscopic image in a space using a light interference phenomenon. The projector 966 may project light onto a screen so as to display an image. For example, the screen may be arranged in the inside or the outside of the electronic device 901. According to an embodiment, the display 960 may further include a control circuit for controlling the panel 962, the hologram device 964, or the projector 966.

The interface 970 may include, for example, a high-definition multimedia interface (HDMI) 972, a universal serial bus (USB) 974, an optical interface 976, or a D-sub-miniature (D-sub) 978. The interface 970 may be included, for example, in the communication interface 870 illustrated in FIG. 8. Additionally or generally, the interface 970 may include, for example, a mobile high definition link (MHL) interface, a SD card/multi-media card (MMC) interface, or an infrared data association (IrDA) standard interface.

The audio module 980 may convert a sound and an electric signal in dual directions. At least a part of the audio module 980 may be included, for example, in the input/output interface 850 illustrated in FIG. 8. The audio module 980 may process, for example, sound information that is input or output through a speaker 982, a receiver 984, an earphone 986, or the microphone 988.

For example, the camera module 991 may shoot a still image or a video. According to an embodiment, the camera module 991 may include at least one or more image sensors (e.g., a front sensor or a rear sensor), a lens, an image signal processor (ISP), or a flash (e.g., an LED or a xenon lamp).

The power management module 995 may manage, for example, power of the electronic device 901. According to an embodiment, a power management integrated circuit (PMIC), a charger IC, or a battery or fuel gauge may be included in the power management module 995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 996 and a voltage, current or temperature thereof while the battery is charged. The battery 996 may include, for example, a rechargeable battery and/or a solar battery.

The indicator 997 may display a specific state of the electronic device 901 or a part thereof (e.g., the processor 910), such as a booting state, a message state, a charging state, and the like. The motor 998 may convert an electrical signal into a mechanical vibration and may generate the following effects: vibration, haptic, and the like. Although not illustrated, a processing device (e.g., a GPU) for supporting a mobile TV may be included in the electronic device 901. The processing device for supporting the mobile TV may process media data according to the standards of Digital Multimedia Broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

FIG. 10 illustrates a block diagram of a program module, according to various embodiments.

According to an embodiment, a program module 1010 (e.g., the program 840) may include an operating system (OS) to control resources associated with an electronic device (e.g., the electronic device 801), and/or diverse applications (e.g., the application program 847) driven on the OS. The OS may be, for example, Android, iOS, Windows, Symbian, or Tizen.

The program module 1010 may include a kernel 1020, a middleware 1030, an application programming interface (API) 1060, and/or an application 1070. At least a portion of the program module 1010 may be preloaded on an electronic device or may be downloadable from an external electronic device (e.g., the first electronic device 802, the second electronic device 804, the server 806, or the like).

The kernel 1020 (e.g., the kernel 841) may include, for example, a system resource manager 1021 or a device driver 1023. The system resource manager 1021 may control, allocate, or retrieve system resources. According to an embodiment, the system resource manager 1021 may include a process managing unit, a memory managing unit, a file system managing unit, or the like. The device driver 1023 may include, for example, a display driver, a camera driver, a Bluetooth driver, a shared memory driver, a USB driver, a keypad driver, a Wi-Fi driver, an audio driver, or an inter-process communication (IPC) driver.

The middleware 1030 may provide, for example, a function that the application 1070 needs in common, or may provide diverse functions to the application 1070 through the API 1060 to allow the application 1070 to efficiently use limited system resources of the electronic device. According to an embodiment, the middleware 1030 (e.g., the middleware 843) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, a security manager 1052, or a payment manager 1054.

The runtime library 1035 may include, for example, a library module that is used by a compiler to add a new function through a programming language while the application 1070 is being executed. The runtime library 1035 may perform input/output management, memory management, or capacities about arithmetic functions.

The application manager 1041 may manage, for example, a life cycle of at least one application of the application 1070. The window manager 1042 may manage a graphic user interface (GUI) resource that is used in a screen. The multimedia manager 1043 may identify a format necessary for playing diverse media files, and may perform encoding or decoding of media files by using a codec suitable for the format. The resource manager 1044 may manage resources such as a storage space, memory, or source code of at least one application of the application 1070.

The power manager 1045 may operate, for example, with a basic input/output system (BIOS) to manage capacity of a battery, temperature, or power, and may determine or provide power information for an operation of an electronic device by using the corresponding information from among the pieces of information. The database manager 1046 may generate, search for, or modify database that is to be used in at least one application of the application 1070. The package manager 1047 may install or update an application that is distributed in the form of package file.

The connectivity manager 1048 may manage, for example, wireless connection such as Wi-Fi or Bluetooth. The notification manager 1049 may display or notify an event such as arrival message, appointment, or proximity notification in a mode that does not disturb a user. The location manager 1050 may manage location information about an electronic device. The graphic manager 1051 may manage a graphic effect that is provided to a user, or manage a user interface relevant thereto. The security manager 1052 may provide a general security function necessary for system security, user authentication, or the like. According to an embodiment, in the case where an electronic device (e.g., the electronic device 801) includes a telephony function, the middleware 1030 may further include a telephony manager for managing a voice or video call function of the electronic device.

The middleware 1030 may include a middleware module that combines diverse functions of the above-described elements. The middleware 1030 may provide a module specialized to each OS kind to provide differentiated functions. Additionally, the middleware 1030 may dynamically remove a part of the preexisting elements or may add new elements thereto.

The API 1060 (e.g., the API 845) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1070 (e.g., the application program 847) may include, for example, one or more applications capable of providing functions for a home 1071, a dialer 1072, an SMS/MMS 1073, an instant message (IM) 1074, a browser 1075, a camera 1076, an alarm 1077, a contact 1078, a voice dial 1079, an e-mail 1080, a calendar 1081, a media player 1082, an album 1083, a timepiece 1084, a payment 1085, health care (e.g., measuring an exercise quantity, blood sugar, or the like) or offering of environment information (e.g., information of barometric pressure, humidity, temperature, or the like).

According to an embodiment, the application 1070 may include an application (hereinafter referred to as "information exchanging application" for descriptive convenience) to support information exchange between an electronic device (e.g., the electronic device 801) and an external electronic device (e.g., the first electronic device 802 or the second electronic device 804). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1070 may include an application (e.g., a health care application of a mobile medical device) that is assigned in accordance with an attribute of an external electronic device. According to an embodiment, the application 1070 may include an application that is received from an external electronic device (e.g., the first electronic device 802, the second electronic device 804, or the server 806). According to an embodiment, the application 1070 may include a preloaded application or a third party application that is downloadable from a server. The names of elements of the program module 1010 according to the embodiment may be modifiable depending on kinds of operating systems.

According to various embodiments, at least a portion of the program module 1010 may be implemented by software, firmware, hardware, or a combination of two or more thereof. At least a portion of the program module 1010 may be implemented (e.g., executed), for example, by the processor (e.g., the processor 910). At least a portion of the program module 1010 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 820), may cause the one or more processors to perform a function corresponding to the instruction. The computer-readable storage media, for example, may be the memory 830.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a front display and a rear display;
a touch panel configured to sense a user input to at least one of the front display and the rear display;
a camera disposed on a rear surface of the electronic device;
a memory in which an application is stored; and
at least one processor electrically connected with the front display, the rear display, the touch panel, and the camera,
wherein the at least one processor is configured to:
display an execution screen including a first object and a second object on both the front display and the rear display, when executing the application,
wherein the first object is related to receiving a first user input on the front display, and the second object is related to receiving a second user input on the rear display,
wherein the first object and the second object, which are output to the front display, and the first object and the second object, which are output to the rear display, are left-and-right reversed,
wherein a text included in the first object and the second object is set not to be reversed,
apply a first operation to the application or a content based on the first user input, and
apply a second operation to the application or the content based on the second user input,
wherein the first operation is different from the second operation.

2. The electronic device of claim 1,
wherein the at least one processor is configured to operate in a first shooting mode and a second shooting mode,
wherein, in the first shooting mode, the at least one processor is configured to control the rear display to display an image obtained by the camera,
wherein, in the second shooting mode, the at least one processor is configured to control the front display to display an image obtained by the camera, and
wherein, when the touch panel senses a user input to the front display, the at least one processor is configured to control the camera.

3. The electronic device of claim 1, wherein the front display and the rear display are implemented with one flexible display panel curved inside the electronic device.

4. The electronic device of claim 2, wherein the at least one processor is configured to:
turn off the front display in the first shooting mode.

5. The electronic device of claim 2, wherein the at least one processor is configured to:
start the first shooting mode when a face of a user of the electronic device, which is registered in advance, is recognized by the camera.

6. The electronic device of claim 5, wherein the electronic device further includes an acceleration sensor, and
wherein the at least one processor is configured to:
start the first shooting mode when the face of the user is recognized and the electronic device is determined as being positioned perpendicularly to a ground surface through the acceleration sensor; and
start the second shooting mode when the electronic device is determined as being positioned horizontally to the ground surface through the acceleration sensor.

7. The electronic device of claim 2, wherein the at least one processor is configured to:
display the user input, which is sensed to the front display, on the rear display.

8. The electronic device of claim 2, wherein the at least one processor is configured to:
activate an area, which corresponds to the rear display, of the touch panel.

9. The electronic device of claim 2, wherein the at least one processor is configured to:
switch to the second shooting mode when a specified user input occurs in the first shooting mode.

10. The electronic device of claim 2, wherein the at least one processor is configured to:
activate an area, which corresponds to the rear display, of the touch panel in the first shooting mode.

11. The electronic device of claim 1, wherein the at least one processor is configured to:
display the second object to be darker than the first object.

12. The electronic device of claim 1, wherein the execution screen further includes:
a third object controllable on the front display and the rear display, and
wherein the at least one processor is configured to:
display the third object visually identically to the first object.

13. The electronic device of claim 1, wherein the front display is implemented with a first display panel, and
wherein the rear display is implemented with a second display panel physically separated from the first display panel.

* * * * *